US012652182B2

(12) United States Patent
Kasimov et al.

(10) Patent No.: US 12,652,182 B2
(45) Date of Patent: Jun. 9, 2026

(54) DISTRIBUTED TRACKING AND VERIFICATION OF OBJECTS USING A BLOCKCHAIN SYSTEM

(71) Applicant: UKCI Holdings Limited, Douglas (IM)

(72) Inventors: Ulvi Kasimov, Washington, DC (US); Suleyman Kasimov, Washington, DC (US)

(73) Assignee: UKCI Holdings Limited, Douglas (IM)

( * ) Notice: Subject to any disclaimer, the term of this patent is extended or adjusted under 35 U.S.C. 154(b) by 173 days.

(21) Appl. No.: 18/598,457

(22) Filed: Mar. 7, 2024

(65) Prior Publication Data

US 2024/0305489 A1 Sep. 12, 2024

Related U.S. Application Data

(60) Provisional application No. 63/488,796, filed on Mar. 7, 2023.

(51) Int. Cl.
*H04L 9/00* (2022.01)
*G06Q 20/06* (2012.01)
*G06Q 20/36* (2012.01)
*H04L 61/4511* (2022.01)

(52) U.S. Cl.
CPC ............. *H04L 9/50* (2022.05); *G06Q 20/065* (2013.01); *G06Q 20/3678* (2013.01); *H04L 61/4511* (2022.05); *G06Q 2220/00* (2013.01); *H04L 2209/56* (2013.01)

(58) Field of Classification Search
CPC ..... H04L 9/50; H04L 61/4511; G06Q 20/065; G06Q 20/3678
USPC ......................................................... 713/193
See application file for complete search history.

(56) References Cited

U.S. PATENT DOCUMENTS

| | | | | |
|---|---|---|---|---|
| 2021/0133700 A1* | 5/2021 | Williams | ........... | G06Q 20/3829 |
| 2021/0279695 A1* | 9/2021 | Rice | ................... | G06Q 30/0239 |
| 2023/0306390 A1* | 9/2023 | Ahmed | ..................... | H04L 9/50 |
| 2023/0336523 A1* | 10/2023 | DeLuca | ............. | H04L 63/0815 |
| 2023/0360031 A1* | 11/2023 | DeLuca | ............. | G06Q 20/3821 |
| 2024/0127258 A1* | 4/2024 | Brannan | ............. | G06F 11/1415 |
| 2024/0177145 A1* | 5/2024 | Miele | ..................... | G06Q 30/01 |

* cited by examiner

*Primary Examiner* — Zi Ye
(74) *Attorney, Agent, or Firm* — NIXON PEABODY LLP

(57) ABSTRACT
A system for managing domain registrations configured to connect to a blockchain wallet running on a client device. The blockchain wallet includes associated keys for a blockchain system. The system is further configured to inspect the blockchain wallet for a first non-fungible token (NFT) associated with a first domain name, and check with a domain name service (DNS) registry on whether the first domain name is registered at the DNS registry. The DNS registry is configured to receive registration information associated with one or more domains. In response to the first domain name being registered at the DNS registry, performing one or more of (i) expiring the first NFT in the blockchain wallet, (ii) adding a second NFT to the blockchain wallet, (iii) adding a fungible token to the blockchain wallet, (iv) removing the first NFT from the blockchain wallet, or (v) exchanging the first NFT for the fungible token.

30 Claims, 7 Drawing Sheets

100

100

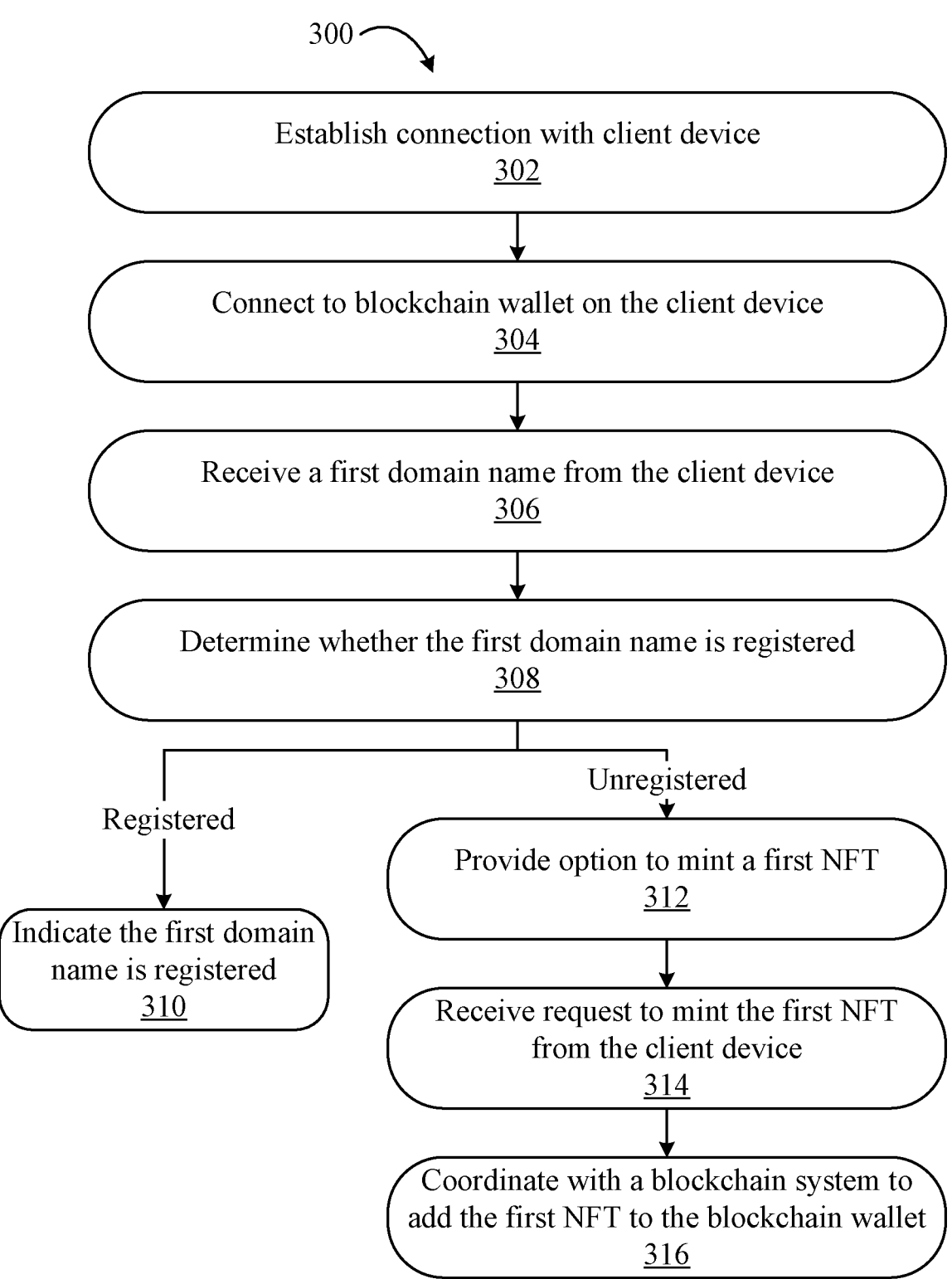

300

Establish connection with client device
302

Connect to blockchain wallet on the client device
304

Receive a first domain name from the client device
306

Determine whether the first domain name is registered
308

Registered

Unregistered

Indicate the first domain name is registered
310

Provide option to mint a first NFT
312

Receive request to mint the first NFT from the client device
314

Coordinate with a blockchain system to add the first NFT to the blockchain wallet
316

Obtain a blockchain wallet
502

Connect to a web server
504

Send request for determining availability of a first domain name
506

Mint a first NFT associated with the first domain name
508

Domain remains
unregistered after
expiration

Domain is registered
before expiration

The first NFT expires
OR
The expiration date
extended
510

Receive reward associated
with the first NFT
512

600

Connect to a blockchain wallet including a first NFT
602

Receive information associated with a unique item
associated with the first NFT
604

Determine a status associated with the unique item
606

Perform an action associated with the first NFT based
on the status associated with the unique item
608

DISTRIBUTED TRACKING AND VERIFICATION OF OBJECTS USING A BLOCKCHAIN SYSTEM

CROSS-REFERENCE TO RELATED APPLICATION

This application claims the benefit of and priority to U.S. Provisional Application No. 63/488,796, filed Mar. 7, 2023, which is hereby incorporated by reference herein in its entirety.

TECHNICAL FIELD

The present disclosure relates generally to information registering, searching, retrieval, authenticating, and modification in database systems, and more specifically, relates to a method for tracking generally unique objects or items (e.g., domain name registrations or other virtual items, registered vehicles or other tangible goods, etc.) in a distributed space.

BACKGROUND

In a marketplace setting, items sold or posted are typically tracked to determine the sale status of the item. For example, a merchant provides several products for sale, and these products can be generally unique from each other. For example, cars are equipped with vehicle identification numbers (VINs) to distinguish one car from another. A car dealership or merchant can track which cars have been sold and which cars are still in inventory using a simple status flag associated with the VIN numbers for the cars the merchant put on sale. Records of items sold are typically tracked electronically, and these electronic records take up storage space. Depending on the ever-growing size of the records, compression algorithms can be used to manage and optimize storage space. In some cases, as the size of the records grow, searching can become cumbersome, therefore, search algorithms are explored to aid in quickly retrieving information contained in the records. Additionally, invoicing, payment and exchange of items are manually tracked using separate computer-based applications and algorithms, requiring coordinating activities of different people at different times. This herding of individuals can lead to permanently incomplete records or an inability to timely record activities. Websites and domain names associated with websites or some other virtual items are examples of items that can be stored in records for tracking purposes.

The Domain Name System originated with the implementation of Advanced Research Projects Agency Network (ARPANET). The Domain Name System enabled individual computers to be identified uniquely for the purpose of transmitting and receiving data over a wide area network. The Domain Name System contains information that allows each computer to be uniquely identified. Each computer on the network is assigned an address, which is known as an Internet Protocol Address (IP Address). Each computer's IP Address consists of a unique string of digits. A domain name consists of a unique string of characters. The Domain Name System maps each unique domain name to its unique IP Address. Domain names consist of two parts: an initial string of alphameric characters followed by a period (commonly known as "dot") and by a second string of alphameric characters. The second string of characters is known as a Top-Level Domain. The Domain Name System recognizes only Top-Level Domains that have been specified by international convention. Some of the most commonly used Top-Level Domains are "com," "net," and "org." The first string of characters followed by the dot and then followed by the Top-Level Domain is known as a Second-Level Domain (SLD).

In addition to the traditional Top-Level Domains (e.g., .COM and .NET), the domain name system and domain name registration system have also evolved to allow the use of new generic Top-Level Domains, which may be applied for from the regulatory body pertaining to registries and registrars, the Internet Corporation for Assigned Names and Numbers (ICANN). Some of these generic Top-Level Domains are often referred to as "vanity" or "brand" domains, such as .MICROSOFT or .COCACOLA. ICANN also allows for "community-based" TLDs, such as .BANK or .HOTEL, "interest and community-based" TLDs, such as .ART, and "geographic" TLDs, such as .AFRICA. Other TLDs may be contemplated by ICANN.

The creation and administration of a new Top-Level Domain creates a proliferation of domain names previously unavailable to the public. The potential number of domain names grew by multiple factors since ".com" and ".net" and other country level Top-Level Domains are no longer the only options. That is, for every domain name in a ".com" there can be an equivalent one in one or more 1200+ generic Top-Level Domains. It is possible that different entities may own these domain names as well. For example, "example-.com" and "example.africa" may be registered to different entities. For at least these reasons, administration of domain names becomes more complex. With appropriate tools, the plethora of new choices also provides opportunities for new, small businesses to serve the domain name marketplace. The present disclosure provides systems and methods for verifying transactions on a blockchain for at least the purposes of record-keeping of generally unique items, improving information authenticity using trusted entities, and reducing computational overhead suffered by monitoring systems when administering domain names.

SUMMARY

According to some implementations of the present disclosure, a system for a domain name registration marketplace is provided. The system includes a non-transitory computer-readable medium storing computer-executable instructions thereon such that when the instructions are executed, the system is configured to: (a) connect to a blockchain wallet running on a client device, the blockchain wallet including associated keys for a blockchain system; (b) inspect the blockchain wallet for a first non-fungible token (NFT) associated with a first domain name; (c) check with a domain name service (DNS) registry on whether the first domain name is registered at the DNS registry, wherein the DNS registry is configured to receive registration information associated with one or more domains; and (d) in response to the first domain name being registered at the DNS registry, perform one or more of (i) expiring the first NFT in the blockchain wallet, (ii) adding a second NFT to the blockchain wallet, (iii) adding a fungible token to the blockchain wallet, (iv) removing the first NFT from the blockchain wallet, or (v) exchange the first NFT for the fungible token.

According to some implementations of the present disclosure, a method for managing domain registrations is provided. The method includes: (a) connecting to a blockchain wallet running on a client device, the blockchain wallet including associated keys for a blockchain system; (b) inspecting the blockchain wallet for a first non-fungible token (NFT) associated with a first domain name; (c) checking with a domain name service (DNS) registry on whether the first domain name is registered at the DNS registry, wherein the DNS registry is configured to receive registration information associated with one or more domains; and (d) in response to the first domain name being registered at the DNS registry, performing one or more of (i) expiring the first NFT in the blockchain wallet, (ii) adding a second NFT to the blockchain wallet, (iii) adding a fungible token to the blockchain wallet, (iv) removing the first NFT from the blockchain wallet, or (v) exchanging the first NFT for the fungible token.

According to some implementations of the present disclosure, a method for tracking a unique tangible item includes: (a) registering the item by associating the item with a first non-fungible token (NFT); (b) connecting to a blockchain wallet running on a client device, the blockchain wallet including associated keys for a blockchain system; (c) inspecting the blockchain wallet for the first NFT associated with the item; (d) determining a status of the item; and (c) in response to the determined status of the item, performing one or more of (i) expiring the first NFT in the blockchain wallet, (ii) adding a second NFT to the blockchain wallet, (iii) adding a fungible token to the blockchain wallet, (iv) removing the first NFT from the blockchain wallet, or (v) exchanging the first NFT for the fungible token.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 3 is a flow diagram illustrating a process for registering a domain using an NFT, according to some implementations of the present disclosure.

Figure 1:
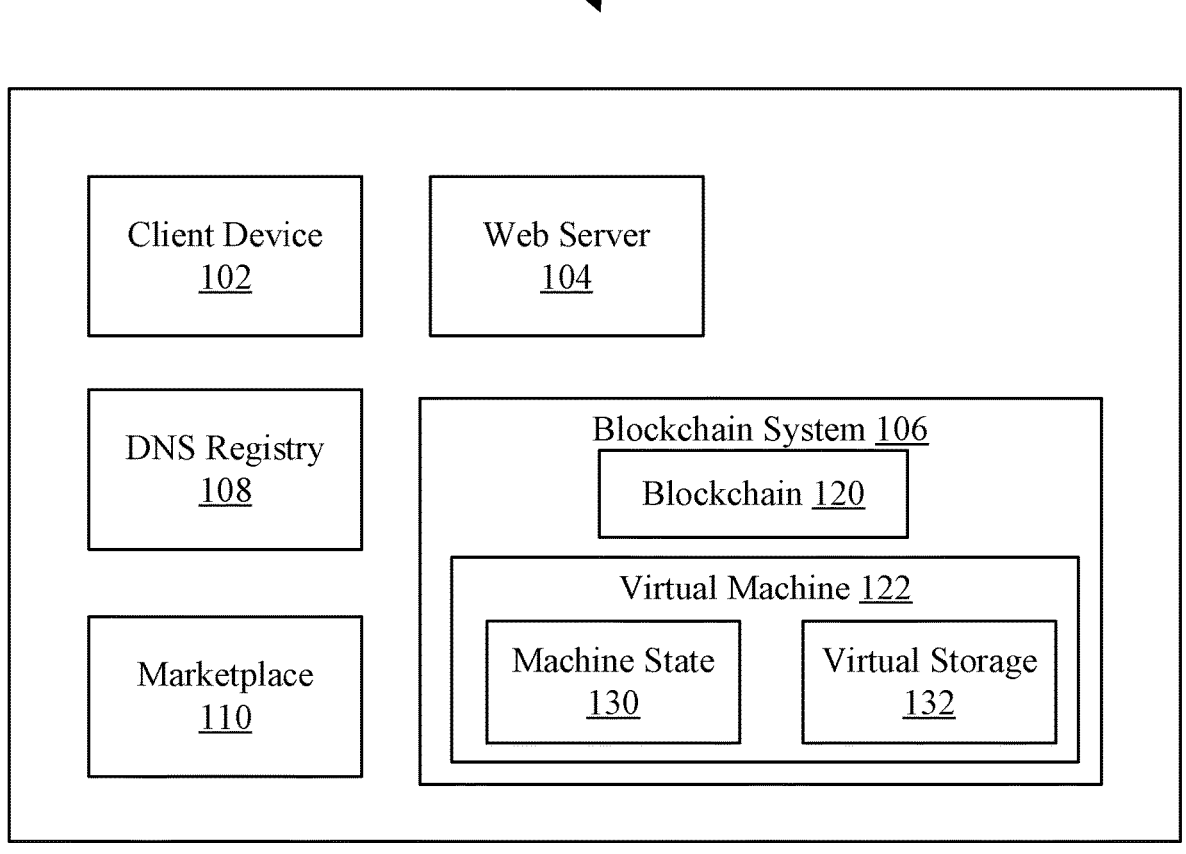
FIG. 1 illustrates a block diagram of a system for managing domain name registrations, according to some implementations of the present disclosure.

The present disclosure is susceptible of various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

There are several instances where items are in need of tracking. Improvements or inventions related to tracking can open new markets and small business opportunities. For example, a status of a tangible item can change over time, and those changes should be populated in a record. The methods for recording such changes can be democratized using computing systems, therefore, any changes to the records should be authorized changes. In an example, a baseball cards merchant wants to sell a collection of unique baseball cards. Each of the baseball cards can be identified via a serial number or a part number. The baseball cards merchant can approach several salespeople to handle the marketing and sales of the cards to customers. These salespeople promote the baseball cards and can be compensated for successfully selling the baseball cards.

In an example scenario, the baseball cards can be sold online, and specific compensation should be provided to the salesperson that successfully sold the card. Typically, updating exchange of goods is tracked using a centralized system with only parties to the transaction having authorization for recording the exchange. Embodiments of the present disclosure provide systems and methods for recording status of goods and automatically performing various tasks based on the recorded status. For example, the change in the status of goods can prompt providing rewards or benefits to the salesperson. A blockchain system is provided for tracking the status of the goods. Tangible goods are not the only goods that can be tracked, and in some cases intangible goods, such as domain names, can be tracked as well.

Domain names are used by individuals in different manners. Some people register domain names to take advantage of their already established trademarks. The registered domain names in these instances are used for business purposes, for example, to serve a marketing website or an ecommerce website. Some people register domain names for personal reasons, for example, to disseminate information on specific hobbies, etc. Some people register domain names for the purpose of holding them in order to resell at a greater value. Administrators of Top-Level Domains market their Top-Level Domains to garner greater registrations and participations in their ecosystem. Some Top-Level Domains are in more demand than others, hence the need for marketing.

The more domain names being registered, the more computing resources are being devoted for the domain name. Typically, existing domain names are conjured up in the minds of individuals, but in the future can be proposed by artificial intelligence. The open-ended nature of which domain names will be registered and when these domain names will be registered can present a logistical nightmare for administrators. For example, administrators may need to know a schedule for maintenance of domain name registration servers, upgrading storage and processing capability of the servers, etc. Administrators typically use projections and monitoring of certain names to determine whether to perform upgrades. If the servers' storage and computational limits are exceeded, the domain name registration servers may not be able to assist in properly routing registered domain names to their specific IP addresses.

Embodiments of the present disclosure provide a system and method for administering domain names to alleviate any monitoring overhead suffered by conventional systems. In some embodiments, a blockchain system capable of storing non-fungible tokens (NFTs) is used in tracking domain names of interest. Instead of an administrator monitoring or guessing which names may be of interest to the public, client devices used by the public and/or a liaison of a Top-Level Domain can track the names that are of interest. By making these changes compared to conventional systems, the domain name registration servers and related servers have a minimum overhead for monitoring specific domain names. These changes also provide other advantages and use cases as will be described below.

Embodiments of the present disclosure provide technical improvements for working with blockchain systems. For example, smart contracts within blockchain systems can be used to monitor a number of non-fungible tokens in a blockchain wallet. Based on the transaction history of the blockchain wallet showing successful registrations, the specific address of the blockchain wallet can be elevated in status as a trusted wallet. Trusted wallets can be imbued with certain advantages, for example, being the only wallets able to mint non-fungible tokens for one-letter domains, two-letter domains, etc. In other systems, these trusted wallets can be quickly identified for a one-step authentication instead of seeking additional authenticating steps to verify identity of the user of the wallet.

FIG. 1 illustrates a block diagram of a system 100 for managing domain name registrations, according to some implementations of the present disclosure. The system 100 can include a client device 102, a web server 104, a domain name service (DNS) registry 108, a blockchain system 106, and a marketplace 110. To simplify the discussion, the singular form will be used for all components identified in FIG. 1 when appropriate, but the use of the singular does not limit the discussion to only one of each component. For example, multiple client devices may be referred to as the client device 102. Furthermore, not all components identified in FIG. 1 are necessary, for example, the marketplace 110 is an optional component. Some or all components of the web server 104 and the DNS registry 108 can be combined in a same physical infrastructure (e.g., a same server farm, a same server, etc.). The blockchain system 106 can represent multiple blockchain systems so that digital assets can be created at once across multiple blockchain systems.

Figure 2:
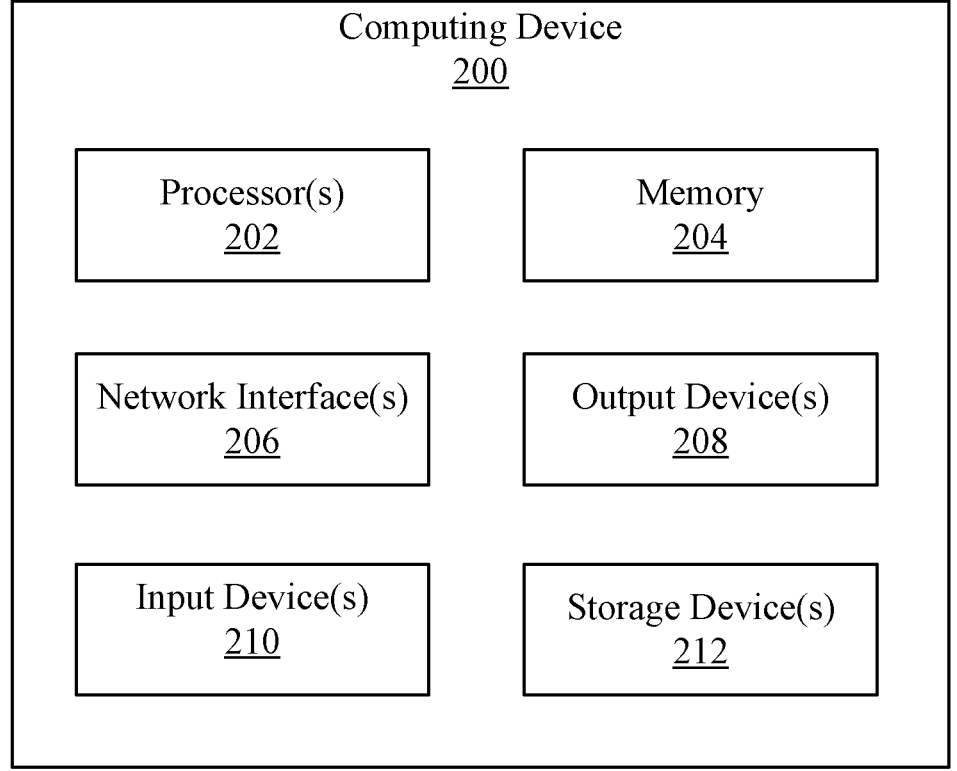
FIG. 2 illustrates a block diagram of a computing device, according to some implementations of the present disclosure.

The client device 102 is a computing device (e.g., computing device 200 of FIG. 2). In some implementations, the client device 102 runs a blockchain wallet that includes associated cryptography keys for performing transactions on the blockchain system 106. The client device 102 can provide requests to the web server 104 for minting an NFT. The client device 102 can provide the web server 102 requests for checking registration status of domain names. In some implementations, the client device 102 is a desktop computer, a laptop computer, a smartphone, a tablet computer, a web browser, a hot wallet, a cold wallet, a etc. The web server 104, the DNS registry 108, and the marketplace 110 can be one or more remote servers (e.g., a cloud server), one or more local servers, etc. Each of the client device 102, the web server 104, the marketplace 110, and the DNS registry 108 can include one or more processors, memory modules, storage devices, etc., to implement functions described herein.

The web server 104 can allow a portal for the client device 102 to mint NFTs on the blockchain system 106. The web server 104 can play an intermediary, providing a graphical user interface (e.g., via a website) for the client device 102 to perform the steps of minting the NFTs. The web server 104 can allow the client device 102 to load its blockchain wallet, exposing public addresses and public keys for the web server 104 to use in performing transactions. The web server 104 uses the exposed information to interact with smart contracts on the blockchain system 106 in order to complete the minting process. In some implementations, the client device 102 receives transaction confirmations that must be signed with the private keys of the blockchain wallet.

In some implementations, the marketplace 110 is provided. The marketplace 110 can be a separate marketplace or can be part of the web server 104. The marketplace 110 connects to the blockchain system 106 and allows users of the client device 102 to view NFTs featured in the blockchain system 106. The blockchain wallet running on the client device 102 can interface with the marketplace 110 in a similar manner as the interface with the web server 104. The blockchain wallet can be used to perform transactions on the marketplace 110. These transactions include buying NFTs, minting NFTs, selling NFTs, viewing properties of NFTs (e.g., percent rarity of certain features of the NFTs), etc.

The DNS registry 108 stores information associated with domain names. For example, the DNS registry 108 can store fields including (i) domain name (e.g., "hello.com"), (ii) creation date of the domain name, (iii) expiration date of the domain name, (iv) domain status, (v) name servers, (vi) registrar, (vii) registrant, (viii) registrant contact, (ix) administrative contact, (x) technical contact, etc. The DNS registry 108 can include a whois server/database for storing the information associated with domain names.

The blockchain system 106 includes one or more computing devices referred to as nodes. There are different types of nodes, for example, a full node or a partial node. Each node includes at least one processor, at least one memory module, and at least one storage device. The blockchain system 106 functions as a distributed database such that each of the full nodes in the blockchain system 106 includes a full copy of information stored in the distributed database. Accordingly, full nodes tend to emphasize storage requirements over processing requirements. On the other hand, some nodes in the blockchain system 106 can be processor intensive. These processor intensive nodes can be referred to as miners which are incentivized to perform transactions on the blockchain (i.e., blockchain 120). The nodes of the blockchain system 106 are peers in the peer-to-peer computing network. The nodes here are described as physical computing systems underlying the infrastructure of the blockchain system 106.

In some implementations, the blockchain 120 is a public ledger (public database) that is organized as a linked list. Each of the items linked together to form the linked list is called a block. The nodes of the blockchain determine whether or not to add a new block to the linked list (i.e., the blockchain 120). Since the blockchain 120 is a distributed database, a consensus algorithm is used by the nodes to determine whether the new block should be added to the blockchain 120. In some implementations, a majority of the nodes are required to reach consensus, and in some implementations, all nodes should unanimously approve the new block. The blockchain system 106 uses cryptography and digital signatures to ensure confidentiality and authentication on the blockchain 120. The blockchain system 106 uses hashing to verify information within the blockchain 120 has not been compromised.

In addition to the consensus algorithm, the blockchain system 106 can include other software that underlie the rules of how the blockchain system 106 operates. In some implementations, the blockchain system 106 includes a virtual machine layer (i.e., virtual machine 122) which can provide a virtual machine environment for programmers or developers to build distributed services and/or software for the blockchain 120. The virtual machine 122 includes a machine state 130 and a virtual storage 132. The machine state 130 can be a stack machine that executes one transaction at a time, with each transaction stored in the stack. The machine state 130 maintains a state transition function for the virtual machine 122. The virtual storage 132 is a virtual memory that facilitates performing calculations for determining states of the virtual machine 122. The virtual storage 132 can store smart contracts. A smart contract is a computer program that automatically executes or documents relevant events. The smart contracts can be stored in bytecode. In some implementations, the blockchain system 106 is the Ethereum blockchain and the virtual machine 122 is the Ethereum Virtual Machine. In some implementations, the blockchain system 106 is the BNB Smart Chain.

In some implementations, the web server 104 hosts a blockchain oracle. The blockchain oracle is a service that connects smart contracts of the blockchain system 106 to information in the outside world. The blockchain oracle allows the blockchain system 106 to have access to information from the outside world as well as feed information to the outside world. The blockchain oracle contains (or is able to extract) information about the state of an object or item that is being tracked. Offloading some of the information to the oracle rather than having that information stored on the blockchain 120 or the blockchain system 106 can reduce computation on the blockchain system 106, thus reducing the transaction costs associated with performing computation on the blockchain system 106. Embodiments of the present disclosure provide the ability of blockchain oracles to digitally sign data intended for use in smart contracts on the blockchain system 106.

The blockchain 120 can be viewed as distributed database, where data is stored in a large number of copies on multiple computing devices connected to each other via the internet. Such a set of interconnected computing devices defines a blockchain network and comprise the blockchain system 106. The advantages of the blockchain oracle are evident because typically, blockchain systems are limited in amount of data that can be stored because recording data is usually not free. The cost of recording data depends on the amount of data, and this cost is typically expressed in native tokens of the blockchain 120. Costs associated with computing on the blockchain 120 are integral to the proper functioning of the blockchain 120 to prevent spam and a never-ending transaction from rendering the blockchain system 106 unusable and in a perpetual busy state. Because anyone can submit transactions to the blockchain system 106, the transaction costs expressed in native tokens prevent a user from monopolizing the blockchain system 106 performing useless tasks. Data addressing in a distributed database uses crypto-addresses identifiers of data containers.

FIG. 2 illustrates a block diagram of a computing device 200, according to some implementations of the present disclosure. The computing device 200 is illustrated as one such device, but based on implementation, multiple such devices can be networked or formed in a cluster to implement one or more components illustrated in FIG. 1. The computing device 200 can be used in realizing any one of the client device 102, the web server 104, the blockchain system 106, the DNS registry 108, the marketplace 110 and/or any associated databases connected to each of these components. The computing device 200 may include one or more processors 202, memory 204, network interfaces 206, output devices 208, input devices 210, and storage devices 212. Although not explicitly shown in FIG. 2, each component provided is interconnected physically, communicatively, and/or operatively for inter-component communications in order to realize functionality of the different components of FIG. 1. To simplify the discussion, the singular form will be used for all components identified in FIG. 2 when appropriate, but the use of the singular does not limit the discussion to only one of each component. For example, multiple processors may implement functionality attributed to the processor 202.

The processor 202 is configured to implement functions and/or process instructions for execution within computing device 200. For example, the processor 202 executes instructions stored in the memory 204 or instructions stored on the storage device 212. In some implementations, instructions stored on the storage device 212 are transferred to the memory 204 for execution at the processor 202. The memory 204, which may be a non-transient, computer-readable storage medium, is configured to store information within the computing device 200 during operation. In some implementations, the memory 204 includes a temporary memory that does not retain information stored when the computing device 200 is turned off. Examples of such temporary memory include volatile memories such as random access memories (RAM), dynamic random access memories (DRAM), and static random access memories (SRAM). The memory 204 also maintains program instructions for execution by the processor 202 and serves as a conduit for other storage devices (internal or external) coupled to the computing device 200 to gain access to the processor 202.

The storage device 212 includes one or more non-transitory computer-readable storage media. The storage device 212 is provided to store larger amounts of information than the memory 204, and in some instances, configured for long-term storage of information. In some implementations, the storage device 212 includes non-volatile storage elements. Non-limiting examples of non-volatile storage elements include flash memories, magnetic hard discs, optical discs, solid state drives, resistive or forms of electrically programmable memories (EPROM) or electrically erasable and programmable (EEPROM) memories.

The network interfaces 206 are used to communicate with external devices and/or servers. The computing device 200 may include multiple network interfaces 206 to facilitate communication via multiple types of networks. The network interfaces 206 may include network interface cards, such as Ethernet cards, optical transceivers, radio frequency transceivers, or any other type of device that can send and receive information. Non-limiting examples of the network interfaces 206 include radios compatible with several Wi-Fi standards, 3G, 4G, Long-Term Evolution (LTE), 5G, Bluetooth®, Bluetooth Low Energy, etc.

The computing device 200 may also be equipped with the one or more output devices 208. The output device 208 is configured to provide output to a user using tactile, audio, and/or video information. Examples of the output device 208 include a display screen (a liquid crystal display (LCD) display, LCD/light emitting diode (LED) display, organic LED display, etc.), a sound card, a video graphics adapter card, speakers, magnetics, or any other type of device that may generate an output intelligible to a user.

The computing device 200 is equipped with the one or more input devices 210. The input devices 210 are configured to receive input from a user or the environment where the computing device 200 resides. In certain instances, the input devices 210 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

FIG. 3 is flow diagram showing a process 300 for managing domain registrations, according to some implementations of the present disclosure. The process 300 includes steps performed by the system 100, and in some cases by the web server 104, to generate tokens for tracking one or more unregistered domain names. At step 302, the web server 104 establishes connection with the client device 102. The established connection can be a secured HTTP connection or any other web-based connection. In some implementations, the web server 104 can provide a webpage that includes options for enrolling a user of the client device 102 to a service provided by the web server 104. For example, a user profile can be created that includes a name of the user, an address of the user, an email address of the user, a phone number of the user, etc.

At step 304, the web server 104 can connect to a blockchain wallet of the client device 102. In an example, the blockchain wallet is a browser based or an app based wallet. Examples of blockchain wallets include MetaMask, Exodus wallet, Coinbase wallet, etc. In some implementations, the web server 104 provides a webpage that includes an option for the user to click on a "connect wallet" link.

At step 306, the web server 104 receives a first domain name from the client device 102. In some implementations, the first domain name can be any domain name for any Top-Level Domain. For example, a broker tracking a specific set of domain names across different domains can provide any one of the specific set of domain names to the web server 104. An individual may be monitoring various "hello.art", "hello.com", "hello.net", "hello.tv", "hello.domain", and so on, to make sure that these domains remain inactive. Although the step indicates the first domain name, the client device can provide a number of domain names (i.e., a second domain name, a third domain name, etc.). In that case, the individual may provide all of these domain names to the web server 104.

In some implementations, the first domain name can be any domain name for a specific Top-Level Domain. For example, a broker associated with a Top-Level Domain (e.g., ".ART") may want to track registration of various ".ART" domain names. The broker may provide "hello.art", "pine.art", "cooler.art", etc., to the web server 104.

At step 308, the web server 104 determines whether the first domain name provided at step 306 is registered. In some implementations, the web server 104 pings the DNS registry 108 for this information. The DNS registry 108 can return a NULL to the web server 104 if the first domain name is not registered. The DNS registry 108 can return a whois field if the first domain name is registered.

If more than one domain name was provided at step 306, then the DNS registry 108 can return indications signifying that all domain names are unregistered, all domain names are registered, or a mix of a first set including one or more domain names that are registered and a second set including one or more domain names that are unregistered.

If the first domain name is registered, then at step 310, the web server 104 indicates to the client device 102 that the first domain name is registered.

If the first domain name is unregistered, then at step 312, the web server 104 provides an option to mint a first NFT on the presented webpage. In some implementations, the web server 104 can obtain contact information (e.g., an email address or a phone number) of the individual minting the first NFT. The contact information can be used to alert the individual when the first domain name has been registered.

At step 314, the web server 104 receives a request to mint the first NFT from the client device.

At step 316, the web server 104 coordinates with the blockchain system to add the first NFT to the blockchain wallet. The first NFT includes information associated with the first domain name. For example, the first NFT can include a unique item identification (e.g., the first domain name), an expiration date, a mint date, a reward percentage, a fixed reward, fees paid to extend the expiration date, etc.

Figure 4:
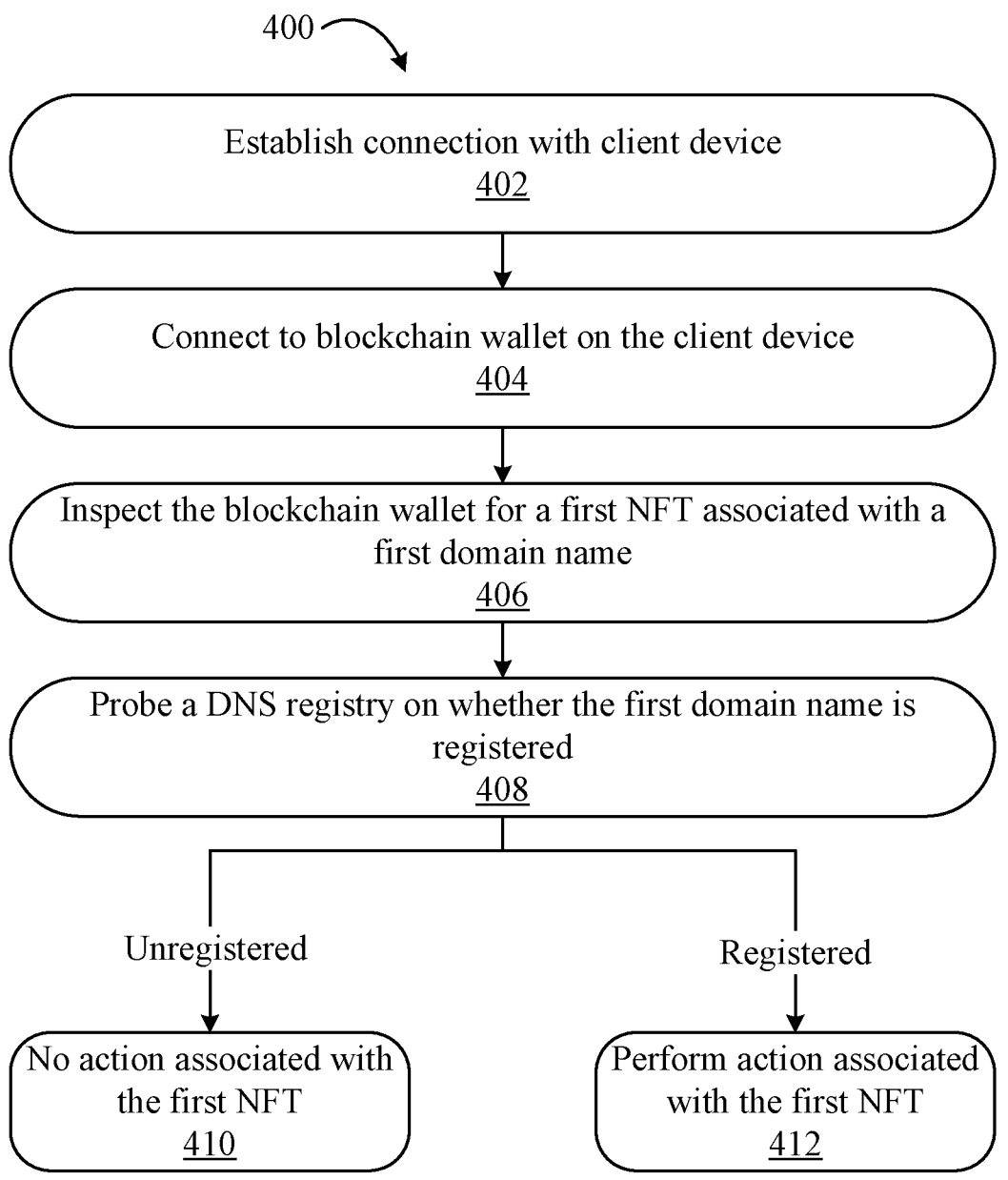
FIG. 4 is a flow diagram illustrating a process for retiring the NFT, according to some implementations of the present disclosure.

FIG. 3 provides a method of creating one or more NFTs associated with a corresponding one or more domain names. FIG. 4 is a flow diagram illustrating a process 400 for retiring the one or more NFTs when associated domain names are registered, according to some implementations of the present disclosure.

The process 400 includes steps performed by the system 100, and in some cases by the web server 104, to perform actions associated with minted NFTs if associated domain names are registered. At step 402, the web server 104 establishes connection with the client device 102. At step 404, the web server 104 connects to a blockchain wallet of the client device 102. Steps 402 and 404 are similar to or the same as steps 302 and 304 of FIG. 3.

At step 406, the web server 104 inspects the blockchain wallet running on the client device 102 for one or more NFTs (e.g., a first NFT) associated with one or more domain names (e.g., a first domain name). If the blockchain wallet includes NFTs associated with domain names, the web server 104 extracts the domain names from the NFTs.

In some implementations, the web server 104 does not extract the domain names from expired NFTs in the blockchain wallet.

At step 408, the web server 104 probes the DNS registry 108 on whether the extracted domain names (e.g., the first domain name) are registered. If the DNS registry 108 returns that the domain names remain unregistered, then at step 410, no action is taken.

If one of the domain names (e.g., the first domain name) is registered, then at step 412, the web server 104 performs an action associated with the NFTs associated with the registered domain names. Actions that can be performed associated with the first NFT include (i) expiring the first NFT in the blockchain wallet, (ii) adding a second NFT to the blockchain wallet, (iii) adding a fungible token to the blockchain wallet, (iv) removing the first NFT from the blockchain wallet, and/or (v) exchanging the first NFT for the fungible token. In some cases, the actions are performed after a grace period. The grace period can be about 5 days or 10 days or 1 week, etc.

Each of the aforementioned actions is performed in concert with smart contracts stored on the blockchain system 106. For example, when expiring the first NFT in the blockchain wallet, the web server 106 can coordinate a change of the expiration date of the first NFT to the present date.

In some implementations, when adding a second NFT to the blockchain wallet, the second NFT can serve as an indication that the first domain is registered and can be paired with the first NFT. In a subsequent inspection, a paired second NFT with the first NFT can serve as an indication that the first domain name has been registered.

In some implementations, a fungible token is added to the blockchain wallet. The fungible token can serve as a reward payout indicated by the first NFT. Example fungible tokens include ether (ETH), BNB, a stablecoin or some other cryptocurrency.

In some implementations, the first NFT is removed from the blockchain wallet. The first NFT can be transferred to a burn wallet. The burn wallet can be under the control of a smart contract that tracks the number of burned NFTs.

In some implementations, smart contracts keep track of all minted NFTs and/or all burned NFTs. For example, a smart contract conforming to the ERC721 standard can store domain names and wallet addresses including NFTs associated with the different domain names. The smart contract can thus track all NFTs by the blockchain wallets that include the NFTs. Any transfers from one blockchain wallet to another blockchain wallet is tracked by the smart contract. The smart contract thus keeps an accurate representation of the blockchain wallet that contains the issued NFT, allowing for one or more actions associated with step 408 to be taken on the appropriate wallet.

Figure 5:
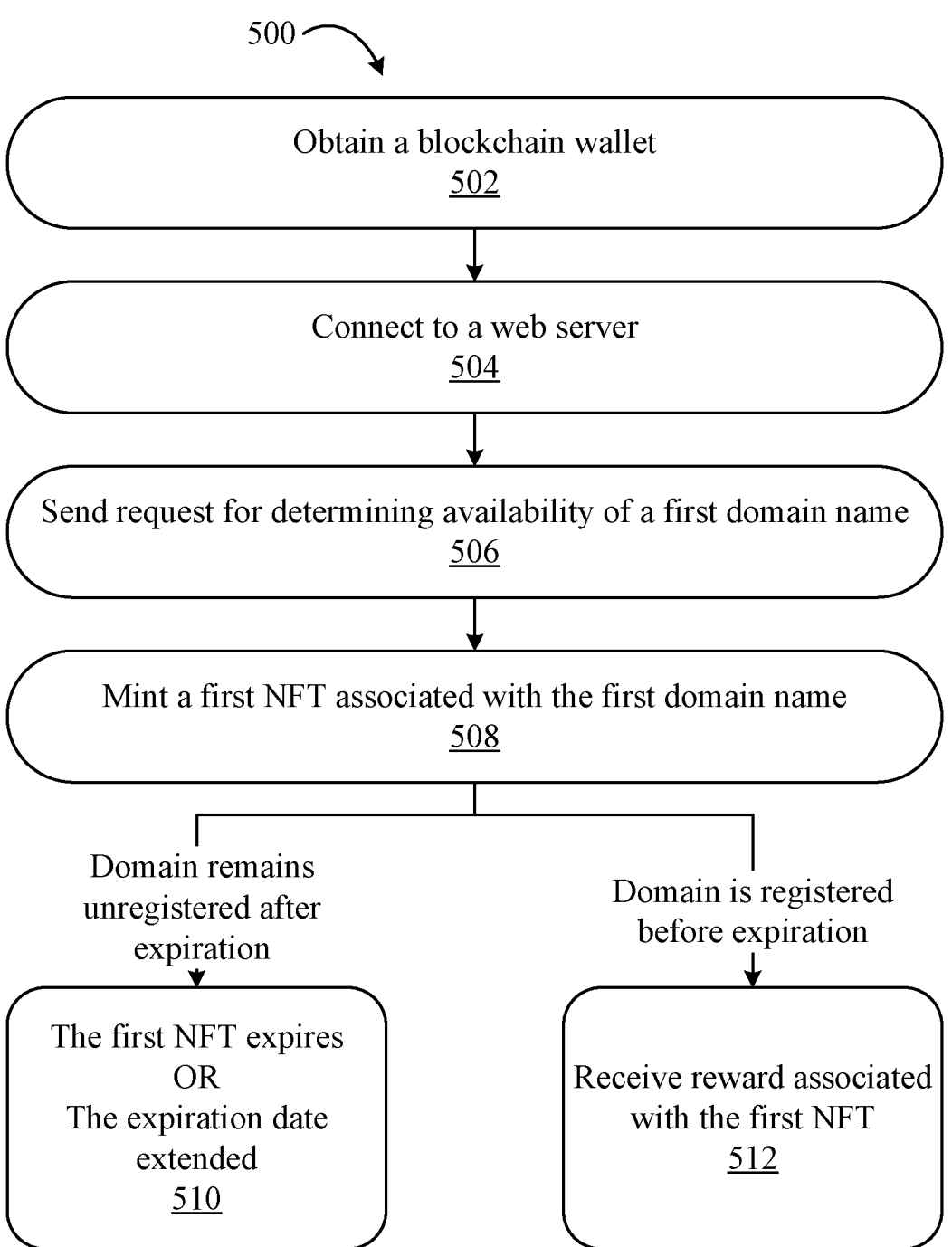
FIG. 5 is a flow diagram illustrating a process for managing domains using NFTs, according to some implementations of the present disclosure.

FIG. 5 is a flow diagram illustrating a process 500 for managing domains using NFTs, according to some implementations of the present disclosure. The process 500 includes steps performed by the client device 102, and in some cases by an ambassador or a broker that manages one or more domain names.

At step 502, the client device 102 obtains a blockchain wallet. For example, the blockchain wallet can be downloaded onto the client device 102.

At step 504, the client device 102 connects to the web server 104. In some cases, the client device 102 enters credentials for logging onto a service provided by the web server 104.

At step 506, the client device 102 sends a request for determining availability (i.e., registration status) of a first domain name. In some cases, the client device 102 can send multiple requests to check for domain name availability.

At step 508, the client device 102 cooperates with the blockchain system 106 and the web server 104 to mint a first NFT associated with the first domain name. Step 508 is performed when the first domain name is available (i.e., unregistered) at step 506.

If the first NFT includes an expiration date and the first domain name remains unregistered after the expiration date, then at step 510, the first NFT expires. In some embodiments, the client device 102 can cooperate with the blockchain system 106 to extend the expiration date.

If the first NFT includes an expiration date and the first domain name is registered before the expiration date, then at step 512, the blockchain wallet can receive rewards associated with the first NFT. For example, fungible token rewards as described above in connection with step 412 (FIG. 4).

Figure 6:
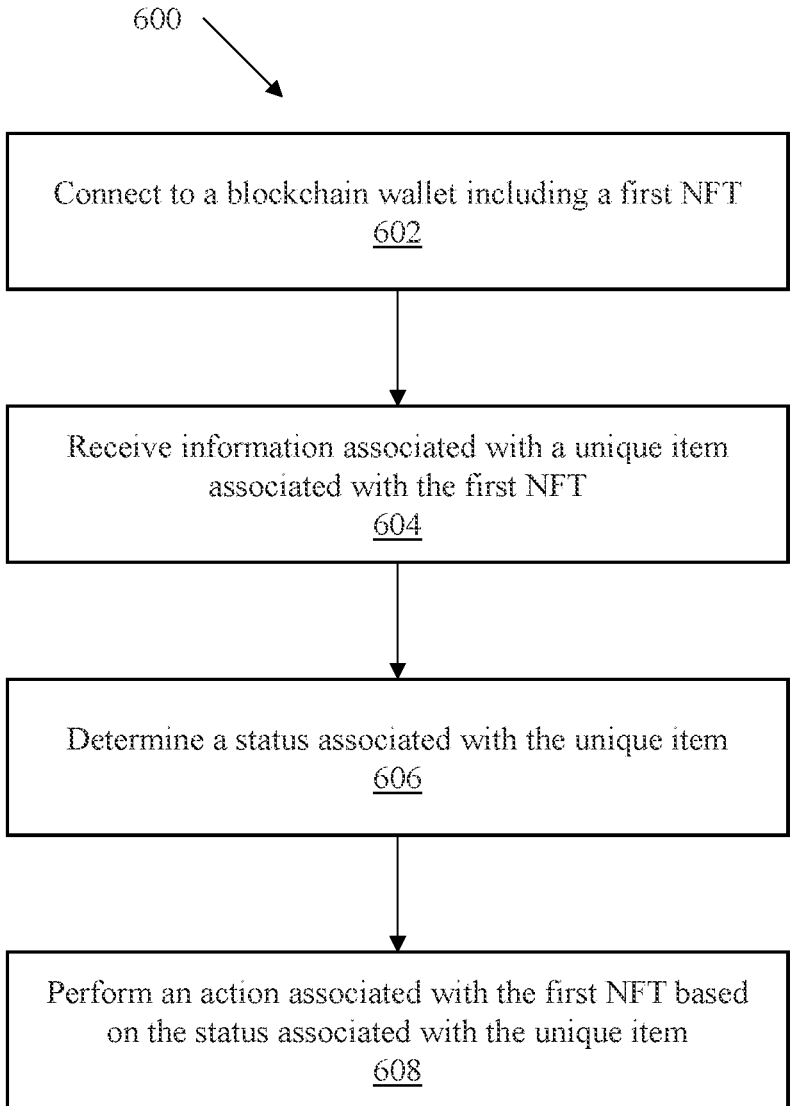
FIG. 6 is a flow diagram illustrating a process for recording transactions associated with a unique item, according to some implementations of the present disclosure.

FIG. 6 is a flow diagram illustrating a process 600 for recording transactions associated with a unique item, according to some implementations of the present disclosure. The unique item is registered by associating the item with a first NFT. That is, a status of the unique item can be represented on the blockchain 120 using the first NFT. Although described in terms of a unique item, in some implementations, one NFT can be associated with multiple items or a group of items. Items can include tangible goods as well as intangible goods (e.g., unique virtual assets). The process 600 is performed by the system 100 or by one or more components of the system 100.

At step 602, the client device 102 connects to a blockchain wallet that includes the first NFT and interacts with the web server 104. The web server 104 provides a frontend to a blockchain oracle.

At step 604, the web server 104 receives information associated with a unique item associated with the first NFT. In some examples, the first NFT includes a name or serial number associated with the unique item. The web server 104 retrieves the information associated with the unique item to identify the unique item related to the first NFT. In some implementations, the unique item is a car, and information associated with the unique item can include a name or model of the car, a VIN number associated with the car, a color of the car, a year the car was manufactured, a place the car was manufactured, etc.

At step 606, the web server 104 determines a status associated with the unique item. In some implementations, the unique item is an item for sale at a merchant's store. The web server 104 can interface with sales servers at the merchant's store to determine whether the item was sold. In some implementations, the web server 104 can interface with online auction information provided on a public website in order to verify whether the item was sold. The status of the unique item can be sold vs. unsold.

In some implementations, the unique item is an item with a limited lifetime or "use life." The status of the unique item can be stored in remote servers or can be calculated based on an elapsed time between the date of manufacture of the unique item and the current date when the status of the unique item is checked. For example, electronic products like cellphones can be estimated to have a limited support life based on contractual manufacturer support. The limited support life can be 1 year, 2 years, 3 years, etc. Depending on the time the cellphone is sold or manufactured, the status of the cellphone can indicate "still supported" vs. "no longer supported" based on a calculation of whether the support life has been exceeded.

In some implementations, the oracle signs the status information obtained. The status information is provided to a smart contract on the blockchain system 106 via the client device 102.

Based on the status associated with the unique item, the blockchain system 106 verifies the signature on the information provided regarding the status associated with the unique item. Once verified, the blockchain system 106 performs an action associated with the first NFT. The action can be one or more as discussed with respect to step 412 (FIG. 4).

The process 600 is a generalized form of the process 400 and can be adapted for tracking domain name registration as discussed in connection with FIG. 4. The processes provided in FIGS. 4-6 provide unique ways of managing an ever evolving record using smart contracts. In the case of domain name registration, each domain name is identifiable and unique. Domain names are created by domain name registry at the moment of sale and are not live before then. Thus, there is no "reseller" entities when domain names are concerned. For tangible products, resellers may exist. For example, a wholesaler can operate as a middleman, buying finished products directly from a manufacturer to resell to the general public. Thus, with domain names, NFTs can be used as a way of marking non-existent domain names of interest and tracking whether these domain names have been registered.

In some implementations, the smart contract includes a ledger that maps unregistered domain name NFTs to wallet addresses such that all unregistered domain names are checked against publicly available data (e.g., a whois database) every thirty minutes, every hour, every four hours, every twenty four hours, etc. The smart contract having this information at hand allows marking of specific unregistered domain names as registered once a domain name is registered. And when the domain name is registered, the NFT associated with the domain name can be marked for further actions as described in connection with step 412.

Due to resource and information costs associated with transactions on the blockchain, step 412 may not be performed automatically. For example, step 412 would have to be initiated by the client device 102 so that the blockchain wallet where the first NFT resides is responsible for the transaction fees (or gas fees) associated with include (i) expiring the first NFT in the blockchain wallet, (ii) adding a second NFT to the blockchain wallet, (iii) adding a fungible token to the blockchain wallet, (iv) removing the first NFT from the blockchain wallet, and/or (v) exchanging the first NFT for the fungible token.

A blockchain wallet with a long transaction history of successfully registering domain names can be elevated to a trusted wallet status. As a trusted wallet, the blockchain wallet will be allowed to mint NFTs associated with one letter domains, two letter domains, etc. In some implementations, at step 412, additional verification information may be required prior to authorizing a step such as adding a fungible token to the blockchain wallet, but trusted wallets can be allowed to bypass such steps. Furthermore, track record of trusted wallets provide better estimation for administrators of domain name servers. The trusted wallets can help forecast storage, processing, and network needs of domain name registration servers.

Figure 7:
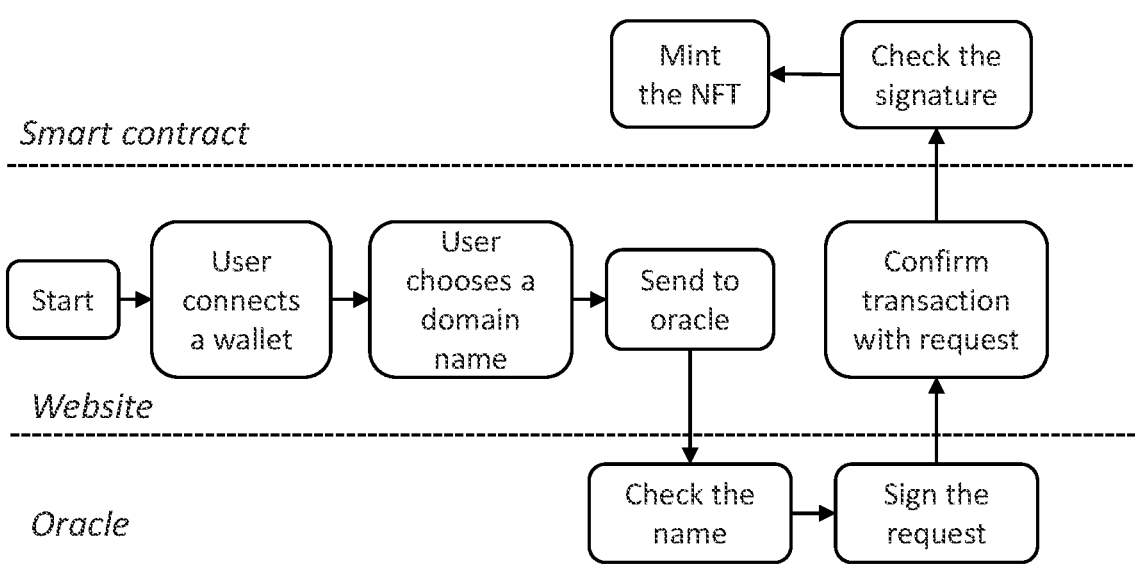
FIG. 7 is a flow diagram illustrating a process for minting an NFT, according to some implementations of the present disclosure.

FIG. 7 illustrates a process for minting an NFT, according to some implementations of the present disclosure. In some examples, an NFT can only be issued for an unsold product or service. To reduce costs associated with transacting on the blockchain 120, sales information is not recorded on the blockchain 120 and is stored in the manufacturer's sales system, and may also be publicly available in the case of domains (e.g., the web server 104). Therefore, a smart contract running on the blockchain system 106 cannot independently verify the availability of an item, product, or service. NFT issuance (or registration) is performed using an oracle capable of verifying the availability of a product or service. For example, the client device 102 sends the NFT issuance request to the oracle. The oracle checks the necessary information required for approving the NFT issuance. In the example where the item or product is an unregistered domain, the oracle verifies the validity of the domain, the availability of the domain, and the price of the domain, and determines a size of the reward when the unregistered domain becomes registered.

In the case where the oracle provides a positive result after checking the necessary information for token issuance, the information for token issuance is signed with a secret digital key. The information and, together with the signature, is transmitted from the oracle back to the client device 102 that sent the NFT issuance request. The client device 102 can then submit the information and signature can be a smart contract running in the blockchain system 106 for issuing the NFT. Prior to running any transaction, the smart contract verifies the oracle's signature, thus establishing the validity of the information received. Upon successful verification of the signature by the smart contract, the smart contract issues the NFT with metadata containing information about the connection to a unique product or service. For example, in the context of domain names, the information can include domain name, reward size, NFT validity period, and so on, as described above.

Figure 8:
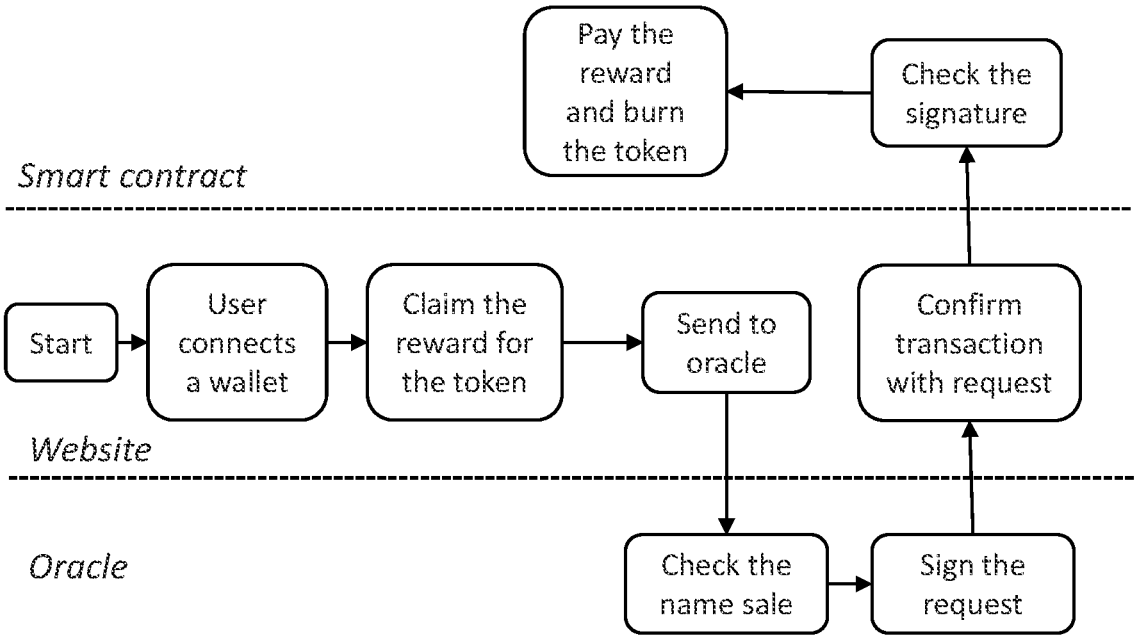
FIG. 8 is a flow diagram illustrating a process for providing rewards based on a minted NFT, according to some implementations of the present disclosure.

FIG. 8 illustrates a process for providing rewards based on a minted NFT, according to some implementations of the present disclosure. Providing rewards is a similar to the process of performing a function with an NFT as described in connection with step 412 (FIG. 4). In one example, when paying a reward, the smart contract destroys the NFT previously created, simultaneously transferring the reward amount to the NFT owner's address. For example, the NFT can be sent to a burn wallet, and fungible token(s) (i.e., the reward) can be provided to the blockchain wallet that previously held the NFT. In some cases, the reward is a second NFT or some other virtual item.

In order to approve the transaction of providing the reward, as in the case of NFT issuance, the smart contract running in the blockchain system 106 needs to be able to independently verify the user's compliance with the contract conditions for receiving the reward. Therefore, an oracle serves as a trusted system to confirm the information about the sale of goods or services. In the case of FIG. 5, the first domain once registered (i.e., once sold to a customer before expiration), the reward is provided (see, e.g., step 512). The user of the client device 102 wishing to receive a reward for the fact of sale initiates the procedure by providing information to the oracle that indicates that the sale has occurred. The oracle checks to verify the fact of the sale and, if confirmed, signs the request for reward with a secret key. The client device 102 sends a transaction to the blockchain system 106, after which the smart contract checks the oracle's signature to pay the reward.

Embodiments of the disclosure provide a new use of a blockchain oracle. The oracle provides a signature that allows the smart contract on the blockchain system 106 to trust information provided in order to perform transactions prescribed in the smart contract. Blockchain oracles today do not provide a signature. Blockchain oracles provide information to blockchain systems, but information provided is based on reputation of the oracles themselves. For example, if Google provides an oracle that provides stock prices to a smart contract on a blockchain system, the stock prices are not signed, and the smart contract has no option but to trust the information provided by Google's blockchain oracle. Having the smart contract verify signatures reduces the likelihood of an unwanted transaction being run on the smart contract. That is, due to the blockchain system 106 being open to the public for performing transactions, any person can initiate a transaction. The requirement of using information that is signed reduces the likelihood of an unwanted transaction being run. This increases security of the blockchain system 106. While conventional oracles trust the reputation of the oracle, oracles that sign information aimed at the blockchain have smart contracts trust specific information instead of merely going by reputation of the oracle.

Embodiments of the present disclosure limits the number of items stored on the blockchain to reduce transaction costs. By reducing information stored on the blockchain, smart contracts become less secure if anyone can pass information to the smart contract. Thus, the oracle that signs the information provides a level of trust so that the smart contract only uses trusted information for transactions. In an example, price lists are not stored on the blockchain, and instead, domain status, domain price, and domain availability can be provided by the blockchain oracle. The oracle serves as an off-chain service for validating information provided to smart contracts running on the blockchain.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting the scope of the disclosure, which is defined by the claims.

ALTERNATIVE IMPLEMENTATIONS

Alternative implementation 1. A system for managing domain registrations includes a non-transitory computer-readable medium storing computer-executable instructions thereon such that when the instructions are executed, the system is configured to: connect to a blockchain wallet running on a client device, the blockchain wallet including associated keys for a blockchain system; inspect the blockchain wallet for a first non-fungible token (NFT) associated with a first domain name; check with a domain name service (DNS) registry on whether the first domain name is registered at the DNS registry, wherein the DNS registry is configured to receive registration information associated with one or more domains; and in response to the first domain name being registered at the DNS registry, perform one or more of (i) expiring the first NFT in the blockchain wallet, (ii) adding a second NFT to the blockchain wallet, (iii) adding a fungible token to the blockchain wallet, (iv) removing the first NFT from the blockchain wallet, or (v) exchange the first NFT for the fungible token.

Alternative implementation 2. The system according to alternative implementation 1, wherein executing the instructions further configure the system to: receive, from the client device, a request to mint the first NFT; and coordinate with the blockchain system and the blockchain wallet to add the first NFT to the blockchain wallet.

Alternative implementation 3. The system according to alternative implementation 2, wherein executing the instructions further configure the system to: receive, from the client device, a request for checking a registration status of the first domain name; check with the DNS registry to determine whether the first domain name is registered, wherein the first NFT is added to the blockchain wallet when the first domain name is unregistered.

Alternative implementation 4. The system according to any one of alternative implementations 1 to 3, wherein the first NFT is tradable to a second blockchain wallet associated with a second client device that is different from the client device.

Alternative implementation 5. The system according to any one of alternative implementations 1 to 4, wherein the first NFT is viewable on a marketplace.

Alternative implementation 6. The system according to any one of alternative implementations 1 to 5, wherein the first NFT has an expiration date.

Alternative implementation 7. The system according to alternative implementation 6, wherein executing the instructions further configure the system to: receive, from the client device, a request to extend the expiration date of the first NFT.

Alternative implementation 8. The system according to any one of alternative implementations 1 to 7, wherein the fungible token has an exchange value associated with a value of the first domain name.

Alternative implementation 9. The system according to any one of alternative implementations 1 to 8, wherein one or more grace periods govern (i) the expiring the first NFT in the blockchain wallet, (ii) the adding the second NFT to the blockchain wallet, (iii) the adding the fungible token to the blockchain wallet, (iv) the removing the first NFT from the blockchain wallet, or (v) the exchanging the first NFT for the fungible token.

Alternative implementation 10. The system according to any one of alternative implementations 1 to 9, wherein the removing the first NFT from the blockchain wallet includes moving the first NFT from the blockchain wallet to a burn wallet.

Alternative implementation 11. The system according to any one of alternative implementations 1 to 10, wherein executing the instructions further configure the system to: receive, from the client device, a request to mint a new NFT associated with the first domain name; and deny the request to mint the new NFT based at least in part on the first NFT being unexpired.

Alternative implementation 12. The system according to any one of alternative implementations 1 to 11, wherein executing the instructions further configure the system to: receive, from a second client device different from the client device, a request to mint a new NFT associated with the first domain name; and deny the request to mint the new NFT based at least in part on the first NFT being unexpired.

Alternative implementation 13. The system according to any one of alternative implementations 1 to 12, wherein a new NFT is minted for the first domain name after the expiring of the first NFT in the blockchain wallet.

Alternative implementation 14. The system according to alternative implementation 13, wherein the new NFT is added to the blockchain wallet.

Alternative implementation 15. The system according to alternative implementation 13, wherein the new NFT is added to a second blockchain wallet associated with a second client device that is different from the client device.

Alternative implementation 16. A method for managing domain registrations, comprising: connecting to a blockchain wallet running on a client device, the blockchain wallet including associated keys for a blockchain system; inspecting the blockchain wallet for a first non-fungible token (NFT) associated with a first domain name; checking with a domain name service (DNS) registry on whether the first domain name is registered at the DNS registry, wherein the DNS registry is configured to receive registration information associated with one or more domains; and in response to the first domain name being registered at the DNS registry, performing one or more of (i) expiring the first NFT in the blockchain wallet, (ii) adding a second NFT to the blockchain wallet, (iii) adding a fungible token to the blockchain wallet, (iv) removing the first NFT from the blockchain wallet, or (v) exchanging the first NFT for the fungible token.

Alternative implementation 17. The method according to alternative implementation 16, further comprising: receiving, from the client device, a request to mint the first NFT; and coordinating with the blockchain system and the blockchain wallet to add the first NFT to the blockchain wallet.

Alternative implementation 18. The method according to alternative implementation 17, further comprising: receiving, from the client device, a request for checking a registration status of the first domain name; checking with the DNS registry to determine whether the first domain name is registered, wherein the first NFT is added to the blockchain wallet when the first domain name is unregistered.

Alternative implementation 19. The method according to any one of alternative implementations 16 to 18, wherein the first NFT is tradable to a second blockchain wallet associated with a second client device that is different from the client device.

Alternative implementation 20. The method according to any one of alternative implementations 16 to 19, wherein the first NFT is viewable on a marketplace.

Alternative implementation 21. The method according to any one of alternative implementations 16 to 20, wherein the first NFT has an expiration date.

Alternative implementation 22. The method according to alternative implementation 21, further comprising: receiving, from the client device, a request to extend the expiration date of the first NFT.

Alternative implementation 23. The method according to any one of alternative implementations 16 to 22, wherein the fungible token has an exchange value associated with a value of the first domain name.

Alternative implementation 24. The method according to any one of alternative implementations 16 to 23, wherein one or more grace periods govern (i) the expiring the first NFT in the blockchain wallet, (ii) the adding the second NFT to the blockchain wallet, (iii) the adding the fungible token to the blockchain wallet, (iv) the removing the first NFT from the blockchain wallet, or (v) the exchanging the first NFT for the fungible token.

Alternative implementation 25. The method according to any one of alternative implementations 16 to 24, wherein the removing the first NFT from the blockchain wallet includes moving the first NFT from the blockchain wallet to a burn wallet.

Alternative implementation 26. The method according to any one of alternative implementations 16 to 25, further comprising: receiving, from the client device, a request to mint a new NFT associated with the first domain name; and denying the request to mint the new NFT based at least in part on the first NFT being unexpired.

Alternative implementation 27. The method according to any one of alternative implementations 16 to 26, further comprising: receiving, from a second client device different from the client device, a request to mint a new NFT associated with the first domain name; and denying the request to mint the new NFT based at least in part on the first NFT being unexpired.

Alternative implementation 28. The method according to any one of alternative implementations 16 to 27, wherein a new NFT is minted for the first domain name after the expiring of the first NFT in the blockchain wallet.

Alternative implementation 29. The method according to alternative implementations 28, wherein the new NFT is added to the blockchain wallet.

Alternative implementation 30. The method according to claim 28, wherein the new NFT is added to a second blockchain wallet associated with a second client device that is different from the client device.

Alternative implementation 31. A method for tracking a unique tangible item comprising: registering the item by associating the item with a first non-fungible token (NFT);

connecting to a blockchain wallet running on a client device, the blockchain wallet including associated keys for a blockchain system; inspecting the blockchain wallet for the first NFT associated with the item; determining a status of the item; and in response to the determined status of the item, performing one or more of (i) expiring the first NFT in the blockchain wallet, (ii) adding a second NFT to the blockchain wallet, (iii) adding a fungible token to the blockchain wallet, (iv) removing the first NFT from the blockchain wallet, or (v) exchanging the first NFT for the fungible token.

Alternative implementation 32. The method according to alternative implementation 31, further comprising: receiving, from the client device, a request to mint the first NFT; and coordinating with the blockchain system and the blockchain wallet to add the first NFT to the blockchain wallet.

Alternative implementation 33. The method according to alternative implementation 32, further comprising: receiving, from the client device, a request for determining availability of the item; checking with a sales system to determine whether the item has been sold, wherein the first NFT is added to the blockchain wallet when the item is unsold.

Alternative implementation 34. The method according to any one of alternative implementations 31 to 33, wherein the first NFT is tradable to a second blockchain wallet associated with a second client device that is different from the client device.

Alternative implementation 35. The method according to any one of alternative implementations 31 to 34, wherein the first NFT is viewable on a marketplace.

Alternative implementation 36. The method according to any one of alternative implementations 31 to 35, wherein the first NFT has an expiration date.

Alternative implementation 37. The method according to alternative implementation 36, further comprising: receiving, from the client device, a request to extend the expiration date of the first NFT.

Alternative implementation 38. The method according to any one of alternative implementations 31 to 37, wherein the fungible token has an exchange value associated with a value of the first domain name.

Alternative implementation 39. The method according to any one of alternative implementations 31 to 38, wherein one or more grace periods govern (i) the expiring the first NFT in the blockchain wallet, (ii) the adding the second NFT to the blockchain wallet, (iii) the adding the fungible token to the blockchain wallet, (iv) the removing the first NFT from the blockchain wallet, or (v) the exchanging the first NFT for the fungible token.

Alternative implementation 40. The method according to any one of alternative implementations 31 to 39, wherein the removing the first NFT from the blockchain wallet includes moving the first NFT from the blockchain wallet to a burn wallet.

Alternative implementation 41. The method according to any one of alternative implementations 31 to 40, further comprising: receiving, from the client device, a request to mint a new NFT associated with the item; and denying the request to mint the new NFT based at least in part on the first NFT being unexpired.

Alternative implementation 42. The method according to any one of alternative implementations 31 to 41, further comprising: receiving, from a second client device different from the client device, a request to mint a new NFT associated with the item; and denying the request to mint the new NFT based at least in part on the first NFT being unexpired.

Alternative implementation 43. The method according to any one of alternative implementations 31 to 42, wherein a new NFT is minted for the item after the expiring of the first NFT in the blockchain wallet.

Alternative implementation 44. The method according to alternative implementation 43, wherein the new NFT is added to the blockchain wallet.

Alternative implementation 45. The method according to alternative implementation 43, wherein the new NFT is added to a second blockchain wallet associated with a second client device that is different from the client device.

Alternative implementation 46. The method according to any one of alternative implementations 31 to 45, wherein determining the status of the item includes obtaining from an oracle signed information indicating the status of the item and verifying the signature on the signed information.

Alternative implementation 47. The method according to alternative implementation 46, wherein the signed information is an indication that the item is sold or the item is unsold.

Alternative implementation 48. A system comprising one or more processors configured to implement the method of any one of alternative implementations 16 to 47.

Alternative implementation 49. A computer program product comprising instructions which, when executed by a computer, cause the computer to carry out the method of any one of alternative implementations 16 to 47.

Alternative implementation 50. The computer program product of alternative implementation 49, wherein the computer program product is a non-transitory computer readable medium.

What is claimed is:

1. A system for managing domain registrations, the system including a non-transitory computer-readable medium storing computer-executable instructions thereon such that when the instructions are executed, the system is configured to:

connect to a blockchain wallet running on a client device, the blockchain wallet including associated keys for a blockchain system;

inspect the blockchain wallet for a first non-fungible token (NFT) associated with a first domain name, the first NFT being found in the blockchain wallet indicating an unregistered status for the first domain name;

check with a domain name service (DNS) registry on whether the first domain name is registered at the DNS registry, wherein the DNS registry is configured to receive registration information associated with one or more domains; and in response to the first domain name being registered at the DNS registry, perform one or more of (i) expiring the first NFT in the blockchain wallet, (ii) adding a fungible token to the blockchain wallet, or (iii) removing the first NFT from the blockchain wallet.

2. The system according to claim 1, wherein executing the instructions further configure the system to:

receive, from the client device, a request to mint the first NFT; and coordinate with the blockchain system and the blockchain wallet to add the first NFT to the blockchain wallet.

3. The system according to claim 2, wherein executing the instructions further configure the system to:
   receive, from the client device, a request for checking a registration status of the first domain name; and
   check with the DNS registry to determine whether the first domain name is registered, wherein the first NFT is added to the blockchain wallet when the first domain name is unregistered.

4. The system according to claim 1, wherein the first NFT is tradable to a second blockchain wallet associated with a second client device that is different from the client device.

5. The system according to claim 1, wherein the first NFT is viewable on a marketplace.

6. The system according to claim 1, wherein the first NFT has an expiration date.

7. The system according to claim 6, wherein executing the instructions further configure the system to:
   receive, from the client device, a request to extend the expiration date of the first NFT.

8. The system according to claim 1, wherein one or more grace periods govern (i) the expiring the first NFT in the blockchain wallet, (ii) the adding the fungible token to the blockchain wallet, or (iii) the removing the first NFT from the blockchain wallet.

9. The system according to claim 1, wherein the removing the first NFT from the blockchain wallet includes moving the first NFT from the blockchain wallet to a burn wallet.

10. The system according to claim 1, wherein executing the instructions further configure the system to:
   receive, from the client device, a request to mint a new NFT associated with the first domain name; and
   deny the request to mint the new NFT based at least in part on the first NFT being unexpired.

11. The system according to claim 1, wherein executing the instructions further configure the system to:
   receive, from a second client device different from the client device, a request to mint a new NFT associated with the first domain name; and
   deny the request to mint the new NFT based at least in part on the first NFT being unexpired.

12. The system according to claim 1, wherein a new NFT is minted for the first domain name after the expiring of the first NFT in the blockchain wallet.

13. The system according to claim 12, wherein the new NFT is added to the blockchain wallet.

14. The system according to claim 12, wherein the new NFT is added to a second blockchain wallet associated with a second client device that is different from the client device.

15. A method for managing domain registrations, comprising:
   connecting to a blockchain wallet running on a client device, the blockchain wallet including associated keys for a blockchain system;
   inspecting the blockchain wallet for a first non-fungible token (NFT) associated with a first domain name, the first NFT being found in the blockchain wallet indicating an unregistered status for the first domain name;
   checking with a domain name service (DNS) registry on whether the first domain name is registered at the DNS registry, wherein the DNS registry is configured to receive registration information associated with one or more domains; and
   in response to the first domain name being registered at the DNS registry, performing one or more of (i) expiring the first NFT in the blockchain wallet, (ii) adding a fungible token to the blockchain wallet, or (iii) removing the first NFT from the blockchain wallet.

16. The method according to claim 15, further comprising:
   receiving, from the client device, a request to mint the first NFT; and
   coordinating with the blockchain system and the blockchain wallet to add the first NFT to the blockchain wallet.

17. The method according to claim 16, further comprising:
   receiving, from the client device, a request for checking a registration status of the first domain name; and
   checking with the DNS registry to determine whether the first domain name is registered, wherein the first NFT is added to the blockchain wallet when the first domain name is unregistered.

18. The method according to claim 15, wherein the first NFT is tradable to a second blockchain wallet associated with a second client device that is different from the client device.

19. The method according to claim 15, wherein the first NFT is viewable on a marketplace.

20. The method according to claim 15, wherein the first NFT has an expiration date.

21. The method according to claim 20, further comprising:
   receiving, from the client device, a request to extend the expiration date of the first NFT.

22. The method according to claim 15, wherein one or more grace periods govern (i) the expiring the first NFT in the blockchain wallet, (ii) the adding the fungible token to the blockchain wallet, or (iii) the removing the first NFT from the blockchain wallet.

23. The method according to claim 15, wherein the removing the first NFT from the blockchain wallet includes moving the first NFT from the blockchain wallet to a burn wallet.

24. The method according to claim 15, further comprising:
   receiving, from the client device, a request to mint a new NFT associated with the first domain name; and
   denying the request to mint the new NFT based at least in part on the first NFT being unexpired.

25. The method according to claim 15, further comprising:
   receiving, from a second client device different from the client device, a request to mint a new NFT associated with the first domain name; and
   denying the request to mint the new NFT based at least in part on the first NFT being unexpired.

26. The method according to claim 15, wherein a new NFT is minted for the first domain name after the expiring of the first NFT in the blockchain wallet.

27. The method according to claim 26, wherein the new NFT is added to the blockchain wallet.

28. The method according to claim 26, wherein the new NFT is added to a second blockchain wallet associated with a second client device that is different from the client device.

29. A system for managing domain registrations, the system including a non-transitory computer-readable medium storing computer-executable instructions thereon such that when the instructions are executed, the system is configured to:
   connect to a blockchain wallet running on a client device, the blockchain wallet including associated keys for a blockchain system;
   inspect the blockchain wallet for a first non-fungible token (NFT) associated with a first domain name;

check with a domain name service (DNS) registry on whether the first domain name is registered at the DNS registry, wherein the DNS registry is configured to receive registration information associated with one or more domains; and in response to the first domain name being registered at the DNS registry, adding a fungible token to the blockchain wallet, wherein the fungible token has an exchange value associated with a value of the first domain name.

30. A method for managing domain registrations, comprising:

connecting to a blockchain wallet running on a client device, the blockchain wallet including associated keys for a blockchain system;

inspecting the blockchain wallet for a first non-fungible token (NFT) associated with a first domain name;

checking with a domain name service (DNS) registry on whether the first domain name is registered at the DNS registry, wherein the DNS registry is configured to receive registration information associated with one or more domains; and in response to the first domain name being registered at the DNS registry, adding a fungible token to the blockchain wallet, wherein the fungible token has an exchange value associated with a value of the first domain name.

* * * * *